Patented Nov. 18, 1952

2,618,643

UNITED STATES PATENT OFFICE 2,618,643

METHOD OF RECOVERING OIL FROM CASTOR BEANS OR THE LIKE

John W. Dunning, Lakewood, Ohio, assignor to The V. D. Anderson Company, Cleveland, Ohio, a corporation of Ohio No Drawing. Application May 4, 1949, Serial No. 91,412

4 Claims. (Cl. 260—412.2)

This invention relates to the recovery of oil from castor beans or similar shell or husk-bearing, oil-containing seeds, nuts or the like. It has for its object to provide an improved method in which the decorticated and processed seeds or meats readily lend themselves to oil removal in mechanical screw presses, solvent extraction plants, or other forms of continuous automatic oil recovery equipment or systems, with consequent highly efficient recovery of high quality oil product.

The castor oil bean is one excellent example of a natural vegetable product in which the seed is encased in a close fitting, tenacious, hard, brittle, exterior husk or shell which becomes a serious obstacle to the efficient separation of high grade oil from the solid, but softer, interior proteinaceous seed or meat. Sunflower seeds have a similar husk. When the whole bean, that is, the hard exterior shell and the interior seeds or meats, together, is processed, the brittle, hard exterior shell causes extreme erosion of the pressure producing members of continuous screw presses or similar continuous oil separating equipment, in adition to which, if the temperature is too high, the effect on the shells produces "off-color" oil, also of low grade. On the other hand, when the seed has been decorticated, by shell removal, so that the interior softer seed or meat alone is processed, preparatory to oil removal, the soft pulpy meat does not give up its oil to a degree which makes such a process economically efficient or practicable. The seeds or meats, en masse, react as though they constituted a more or less homogeneous semi-solid, from which the oil cannot readily be caused to separate or from which it does not readily exude.

Thus, the tendency of present practice is to process the shell-bearing seeds at relatively low temperature, preferably not above 105° F. and never above 120° F., to avoid "off color" oil, temperatures at which the moisture content, though increased slightly, due to steam injected for heating, never rises materially or to any excess value. The final result always has been relatively low oil yield, with high cost for repair or replacement of excessively worn or eroded pressing equipment, and always with the liability of producing oil of low grade or which is "off-color."

For convenience, and in no sense of limitation, the invention will be described with reference to castor oil beans, although applicable to other seeds or nuts.

The invention, stated in a more or less general way, consists in first decorticating the seed, not only to avoid its wear or erosion of the pressure producing members of screw presses or other processing equipment, as well as its tendency to cause "off-color" product, but also to reduce the total bulk of material subjected to the oil separating step, the shells usually constituting 20 to 30% by weight of the whole bean.

Next, a mass of the shell-free seeds or meats is suitably treated or processed to convert it from the usual more or less homogeneous soft, pulpy mass, from which oil is not readily separated, to a distinctly heterogeneous, rubbery mass from which the oil readily exudes, as when a lump is pressed with the fingers, or from which the oil is readily separable by appropriate treatment.

Finally, the oil is physically separated from the solid residue in any suitable manner, such as by pressure in a press, or by solvent extraction, or by a combination of the two.

Decortication is accomplished in any suitable manner or by any suitable means, such as by cracking the shells of dry beans (in the case of castor beans) at normal temperature in an attrition mill, a bar mill, or any other suitable mill or machine. This mill should be continuous in operation and capable of adjustment to crack and separate the shells from substantially all of the beans, however large or small, without comminuting, crushing or disintegrating the interior seeds or meats, thus avoiding, so far as possible, loss of fine particles of oil bearing seed substance when the shells as a class are separated from the seeds or meats.

The resultant mass of cracked shells and meats is then conveyed to and subjected to the effect of an aspirator or other suitable equipment for removal of the shells from the meats. This step should be performed as nearly quantitatively as is possible, since retention of any appreciable amount of shells with the oil bearing seeds or meats to that extent results in the production of "off-color" oil during the subsequent conditioning step, and later causes severe erosion of equipment. For example, experience in practice shows that a castor bean meat mass containing not more than about 2% by weight of shells may be processed satisfactorily and produce satisfactory product according to this invention, whereas, meats which contain 5% by weight, or more, of shells produce "off-color" oil, and even then are processed for oil separation only with great difficulty.

Next, the mass of oil bearing seeds or meats, shell-free, is treated or processed under appropriate conditions, preparatory to oil separation therefrom. Appropriate conditions include temperature, moisture content and time of treatment.

The purpose of the treatment is to convert or transform the mass of shell-free seeds or meats from the more or less homogeneous soft, pulpy form produced by prior or known processes, and from which oil cannot be separated efficiently or on an economical basis, to a heterogeneous, rubber-like, tenacious, pliable substance, from which oil readily exudes or from which it is readily separated by appropriate treatment.

Treatment may be performed in any suitable manner and in any desired apparatus. It has been found that a preferred manner consists in conveying the mass of seeds or meats through a jacketed conveyor or drum heated with low pressure steam and provided, if desired or necessary, with means for supplying steam or moisture to the chamber within which the meats undergo treatment. For example, at the point where the castor meats, substantially shell-free, enter the chamber, a stream of live steam is caused to impinge upon the meats in the same direction in which they progress to the outlet, and further steam or moisture may be added to the meat mass as it travels along.

Temperature is important in that it should be above those temperatures to which prior processing has been limited (105° F. to 120° F.) on account of the presence of shells and the consequent "off-color" effect upon the oil produced. Preferably treatment should be carried on at a temperature of at least 130° F., or within the range of 130° to 150° F., and may go even higher to a point short of toasting or burning the meats.

But high temperature alone is not sufficient, because numerous experiments have shown that the castor bean seed or meat, in ordinary dry form, may be heated to unusually high temperatures (above 150° F.) with little or no change of the pulpy carbohydrate-protein constituents. Moisture, and usually excess moisture, is necessary, as evidenced by the fact that its addition to a pulpy seed mass heated to 150° F. or over immediately causes transformation of the carbohydrate-protein constituents and the production of the desired heterogeneous rubbery pliable substance from which the oil is readily separable.

So, the seed mass is subjected to treatment at temperatures as low as 130° F. but which may exceed 150° F. in the presence of or while excess moisture is being added up to 15 to 25% by weight of the total mass. Treatment goes on for a period of time ranging from five or ten minutes to an hour, depending upon the rate of heat transfer into the mass and capable of variation by adjusting the rate of travel of the mass through the treating chamber.

Usually, the desired transformation of the carbohydrate-protein mass may be accomplished in from five to twenty minutes. Visual inspection of the meats may be made for the purpose of making preliminary adjustments of the conditioning factors of time, temperature and moisture content to produce properly conditioned meats having a tough pliable structure and oily in appearance, as contrasted with the soft, mushy or pulpy structure and milky appearance of the non-conditioned meat.

The conditioned meats are next treated in any suitable manner to separate oil from solid residue. For this purpose the treated seed mass may be conducted directly, without time loss, to a continuous screw press or other suitable mechanical equipment, in which a first quality oil may be separated from press cake containing 5 to 8% of oil. Or, if desired, the meats may be lightly pressed to leave a cake containing 10 to 20% oil which then may be solvent extracted to reduce the oil in the cake to 1% or less.

One of the most important advantages of the invention is the ability to produce, economically, the maximum amount of high quality oil without danger of "off-color" characteristics. A further advantage is the reduction in bulk consequent upon preliminary removal of the shells or husks, which comprise 20 to 30% by weight of the whole castor bean. By treating decorticated beans the capacity of the oil separating or recovering equipment is correspondingly increased.

Other advantages of the invention will be apparent to those skilled in the art.

What I claim is:

1. The method of recovering high grade oil from the meats of decorticated castor beans comprising subjecting the meats during a limited time period to a temperature of at least 130° F. in the presence of intentionally added moisture, whereby to convert the carbohydrate-protein content of the meats into a tough, tenacious, rubbery, heterogeneous mass from which the oil may be readily removed, and thereafter extracting the oil from said meats.

2. The method of recovering high grade oil from the meats of decorticated castor beans comprising subjecting the meats during a limited time period to a temperature of from 130° F. to 150° F., while increasing the absorbed moisture content of the meats above the moisture content normally present therein, to thereby convert the carbohydrate-protein content of the meats into a tough, tenacious, rubbery, heterogeneous mass from which the oil may be readily removed, and thereafter extracting the oil from said meats.

3. The method of recovering high grade oil from the meats of decorticated castor beans, and sunflower seeds, comprising subjecting the meats during a limited time period to a temperature of from 130° F. to 150° F. while increasing the absorbed moisture content to a total of from 15% to 25%, to thereby convert the carbohydrate-protein content of the meats into a tough, tenacious, rubbery, heterogeneous mass from which the oil may be readily removed, and thereafter extracting the oil from said meats.

4. The method of recovering high grade oil from the meats of decorticated exceptionally hard-shelled seeds and nuts such as sunflower seeds and castor beans, comprising subjecting the meats to a temperature of from 130° F. to 150° F. for from 5 to 20 minutes while increasing the moisture content to a total of from 15% by weight to 25% by weight in the meats, to thereby convert the carbohydrate-protein content of the meats into a tough, tenacious, rubbery, heterogeneous mass from which the oil may be readily removed, and thereafter extracting the oil from said meats.

JOHN W. DUNNING.

REFERENCES CITED

The following references are of record in the file of this patent:

UNITED STATES PATENTS

| Number | Name | Date |
| --- | --- | --- |
| 168,164 | Lawther | Sept. 28, 1875 |
| 260,182 | Field | June 27, 1882 |
| 307,124 | Leder | Oct. 28, 1884 |

OTHER REFERENCES

"Chemical Technology and Analysis of Oils, Fats and Waxes," by J. Lewkowitsch, 6th ed., vol. II, published 1922 by the MacMillan Company, New York, pages 7, 8, 9, 10, 11, 27; also 404 and 405.

"Cottonseed and Cottonseed Products," by A. E. Bailey, copyright 1948, published by Interscience Publishers, Inc., New York, pages 602, 610, 617, 625 to 627, 649.